(12) United States Patent
Bedouet

(10) Patent No.: US 7,109,606 B2
(45) Date of Patent: Sep. 19, 2006

(54) HIGH-SECURITY ELECTRIC POWER SUPPLY DEVICE

(75) Inventor: Bernard Bedouet, Bourg les Valence (FR)

(73) Assignee: Thales, Paris (FR)

( * ) Notice: Subject to any disclaimer, the term of this patent is extended or adjusted under 35 U.S.C. 154(b) by 468 days.

(21) Appl. No.: 10/399,771

(22) PCT Filed: Oct. 19, 2001

(86) PCT No.: PCT/FR01/03253

§ 371 (c)(1),
(2), (4) Date: Apr. 24, 2003

(87) PCT Pub. No.: WO02/35680

PCT Pub. Date: May 2, 2002

(65) Prior Publication Data

US 2004/0036357 A1    Feb. 26, 2004

(30) Foreign Application Priority Data

Oct. 24, 2000    (FR)    ................... 00 13636

(51) Int. Cl.
*H02J 1/00*    (2006.01)
*H02J 1/10*    (2006.01)
*H02J 9/00*    (2006.01)
*H02J 9/06*    (2006.01)

(52) U.S. Cl. .............................. 307/81; 307/29; 307/65
(58) Field of Classification Search .................. 307/29, 307/65, 81
See application file for complete search history.

(56) References Cited

U.S. PATENT DOCUMENTS

| 5,659,208 A | * | 8/1997 | Kimble et al. ................. 307/82 |
| 5,936,318 A | * | 8/1999 | Weiler et al. .................. 307/66 |
| 5,994,793 A | * | 11/1999 | Bobry ........................... 307/64 |
| 6,097,584 A | | 8/2000 | Bedouet ..................... 361/93.1 |
| 6,288,912 B1 | | 9/2001 | Bedouet ........................ 363/15 |
| 6,472,774 B1 | | 10/2002 | Bedouet ....................... 307/31 |
| 6,555,935 B1 | * | 4/2003 | Maskovyak et al. ........ 307/125 |

FOREIGN PATENT DOCUMENTS

| JP | 63294212 | * 11/1988 |
| JP | 06 335178 | 12/1994 |
| JP | 09 200974 | 7/1997 |

* cited by examiner

*Primary Examiner*—Brian Sircus
*Assistant Examiner*—Hal I. Kaplan
(74) *Attorney, Agent, or Firm*—Oblon, Spivak, McClelland, Maier & Neustadt, P.C.

(57) ABSTRACT

An electrical energy supply device, in particular for carriage on board an aerodyne, supplying DC current to electrical consumers from at least one electrical network chosen by a selector circuit of the supply device, from a plurality of electrical networks. The supply device includes an adapter per electrical network each of the adapters providing, from the respective electrical network to which the adapter is connected, a preset DC voltage, for supplying the electrical consumers. The choice by the selector circuit, of the electrical network and of its associated adapter supplying the electrical consumers, is dependent on the level of the preset DC voltage of said adapters. Such a device may find particular application to supplying of equipment carried on board aircraft.

7 Claims, 4 Drawing Sheets

HIGH-SECURITY ELECTRIC POWER SUPPLY DEVICE

The present invention relates to an electrical energy supply device for a plurality of electronic modules and in particular for supplying the equipment carried on board aerodynes.

Aerodynes comprise a great deal of electronic equipment supplied with DC current by several electrical supply networks operating either in AC current or in DC current mode. The electronic equipment is supplied from several electrical networks for reasons of continuity of operation in the event of a failure of one of the networks.

The voltages provided by the networks of the aerodynes are of variable levels and strongly disturbed. These voltage variations, due among other things to the untimely electrical switchings of the equipment on the supply networks, are prejudicial to the equipment. For example, an aircraft on-board network operating in DC current mode, with nominal voltage 28 volts, may exhibit transient voltage variations of from 12 to 60 volts; an on-board network operating in AC current mode may exhibit amplitude variations of the same order of magnitude.

Moreover, equipment carried on board aerodynes is evolving toward an ever more modular and ever more integrated structure comprising racks, cabinets or bays in which a multitude of modules are gathered together. These modules require their own supply independent of the nature of the on-board network (alternating current or direct current network).

FIG. 1 represents a schematic of a distributed type architecture of a DC current supply device 10, according to the state of the art, for p items of equipment C1, C2, . . . Cp (which, using a more general term, will be referred to as electrical consumers) of an aerodyne, from n electrical supply networks R1, R2, . . . Rn.

In the example of FIG. 1, the supply device 10 comprises a common DC supply line 12 for all the electrical consumers, each consumer C1, C2, . . . Cp being supplied through a respective protection device L1, L2, . . . Lp.

The common line 12 of the supply device is connected to at least one of the on-board networks R1, R2 . . . Rn through a selection contactor S1, S2, . . . Sn of the network and an adaptation block A1, A2, . . . An which are associated with this network. The main function of the adaptation blocks is the provision, from networks of different natures and stabilities, of a regulated or semi-regulated DC supply voltage Vr for the consumers.

A network manager 14 caters for the selecting of at least one network Rx (x being an integer lying between 1 and n) from the set of networks R1, R2, . . . Rn as a function of respective priorities P1, P2, . . . Pn allocated to each of the networks. For example these priorities can define the order of use of the network. For this purpose, during the supplying of the consumers, the network manager 14 closes the contactor associated with the selected network energizing the common supply line 12 of the supply device for the consumers under the voltage Vr.

In the event of a failure or fault of the network in service the network manager 14 opens the contactor associated with the failed network and then closes the contactor associated with the new chosen network of next priority.

The supply device 10 furthermore comprises a battery 16 of capacitors connected in parallel with the common supply line 12 for the consumers so as to eradicate dropouts appearing on the networks. These dropouts may attain durations of the order of 500 milliseconds. For a distributed power of 500 watts, the value of this battery 16 of capacitors may attain 0.5 farads. A battery of 0.47 farads may consist for example of about one hundred capacitors of 4 700 microfarads.

This architecture of the supply device 10 of the state of the art exhibits several drawbacks. Firstly, there is only one network manager 14 and a failure of said network manager may cause the opening of all the contactors S1, S2 . . . Sn producing the powering down of all the equipment, this presenting a serious danger in the case of aerodynes.

Moreover, just one of the capacitors of the battery 16 of capacitors in parallel with the common line 12 may cause the supply device to go out of service. A protection by fuse is required for each capacitor so as to avoid the shutting down of all the consumers, this complicating the maintenance and increasing the cost of the supply device.

In order to alleviate the drawbacks of the prior art, the invention proposes an electrical energy supply device, in particular for carriage on board an aerodyne, supplying DC current to electrical consumers C1, C2, . . . Cp from at least one electrical network Rx chosen by a selector circuit of the device, from a plurality of electrical networks R1, R2, . . . Rn, the supply device comprising an adapter A1, A2, . . . An per electrical network (R1, R2, . . . Rn), each of the adapters providing, from the electrical network to which the adapter is connected, a respective preset DC voltage V1, V2, . . . Vn for supplying the electrical consumers, characterized in that the selector circuit is a switchpoint with diodes comprising diodes D1, D2, . . . Dn whose cathodes are together connected to a common supply point of the consumers, the anodes being respectively connected to the electrical networks R1, R2, . . . Rn through its respective adapters A1, A2, . . . An and in that each of the diodes D1, D2, . . . Dn of the switchpoint comprises a make/break switch I1, I2, . . . In in parallel so as to short-circuit its respective diode when the latter is traversed by at least a part of the current supplying the consumers, which part is provided by the chosen electrical network Rx supplying the electrical consumers, the chosen electrical network being that connected to the adapter providing the highest preset DC voltage Vx.

In the supply device according to the invention, a priority level P1, P2, . . . Pn can easily be assigned to each network R1, R2, . . . Rn by presetting the levels of the voltages V1, V2, . . . Vn at the output of the adapters connected to the networks. Thus, in one embodiment of the supply system according to the invention with diode switchpoint, when the DC voltage level at the output of the adapter of a first network is higher than the DC voltage level at the output of the adapter of a second network, the first network will have a higher priority level than the second network, that is to say the first network will be selected in priority over the second network.

The network selection device based on a diode switchpoint has the advantage of comprising few components and hence of being very reliable.

The switchpoint comprises diodes D1, D2, . . . Dn whose cathodes are together connected to a common supply point for the consumers, the anodes of the diodes being connected respectively to the electrical networks R1, R2, . . . Rn through their respective adapters A1, A2, . . . An, the chosen network supplying the electrical consumers, being that connected to the adapter providing the highest preset DC voltage. Furthermore, when one of the diodes of the switchpoint is traversed by at least a part of the supply current to the consumers, which part is provided by the chosen network, the make/break switch in parallel with this diode is closed short-circuiting said diode. The short-circuit of the diode, by its associated make/break switch, avoids loss of energy in the diode, due to its conduction threshold. This has the advantage of avoiding unnecessary energy losses, a saving of energy such as this being very significant in aircraft.

In a variant of the preferred embodiment of the supply device, each of the consumers is supplied through a protection device L1, L2, ... Lp for protecting against overloads by disconnecting the consumer from its supply, an energy reserve capacitor Ca1, Ca2, ... Cap being connected between the output of the protection device and a reference potential of said device and in that a diode X1, X2, ... Xp for paralleling the energy reserve capacitors is connected between the input and the output of the protection device, the anode of the paralleling diode being connected on the consumer supply side.

Other characteristics and advantages of the invention will become apparent on reading the detailed description which is given with reference to the appended drawings in which:

FIG. 1, already described, represents a schematic of a distributed type architecture of a supply device of the prior art;

Figure 2:
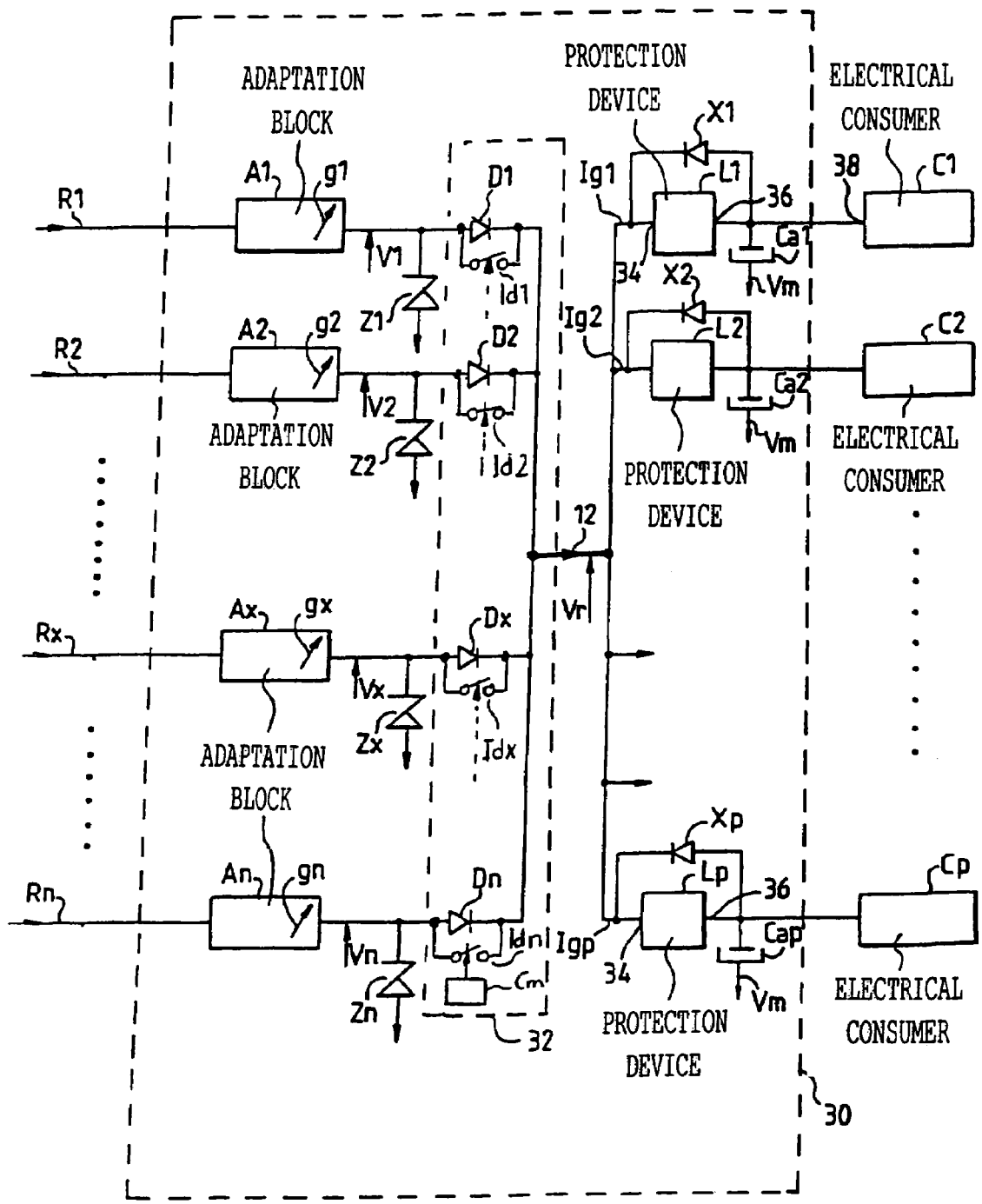
FIG. 2 represents a schematic of a distributed type architecture of a supply device according to the invention.

FIG. 2 represents a schematic of a distributed type architecture of a supply device 30 according to the invention. The device supplies the p electrical consumers C1, C2, ... Cp of an aerodyne from n electrical networks R1, R2, ... Rn of different natures, some networks operating in AC current mode and others in DC current mode.

The supply device 30 comprises the common line 12 for supplying DC current to the set of electrical consumers C1, C2, ... Cp through their respective protection devices L1, L2, ... Lp. The protection devices L1, L2, ... Lp are tripout limiters affording protection of the consumers on the one hand, against overvoltages which may appear on the common supply line 12 and, on the other hand, against current surges, by the tripping out of the protection device.

The on-board networks R1, R2, ... Rn and their associated adapters A1, A2, ... An are connected to the common supply 12 through the diodes D1, D2, ... Dn of a diode switchpoint 32 catering for the selecting of a supply network Rx for the consumers, from among the on-board networks R1, R2, ... Rn, x being able to take a value from 1 to n.

The main function of the adaptation blocks is the adaptation of the nature and of the level of the voltages of the networks R1, R2, ... Rn by providing the common supply line 12 for the consumers with a regulated or semi-regulated DC voltage Vr this voltage Vr being able to take one of the values V1, V2, ... Vn according to the network chosen.

The selector circuit 32 comprises the diodes D1, D2, ... Dn whose cathodes are together connected to the common supply line 12 for supplying the consumers, the anode of each of the diodes being connected respectively to the networks R1, R2, ... Rn through the respective adapters A1, A2, ... An and make/break switches Id1, Id2, ... Idn, each make/break switch being connected in parallel with its respective diode D1, D2, ... Dn so as to short-circuit it when it is traversed by a current. The make/break switches are controlled by a control circuit Cm according to a principle described hereinbelow.

A peak-limiter device Z1, Z2, ... Zn is connected respectively to each of the DC current outputs of the adapters A1, A2, ... An eliminating any failure caused by possible overvoltages at the output of said adapters.

The adapters A1, A2, ... An each comprise a setting g1, g2 ... gn making it possible to adjust their output DC voltage level to predefined levels. These predefined voltage levels determine levels of priority P1, P2, ... Pn of the electrical networks.

Hereinbelow the manner of operation of the supply device shall be described with the aid of FIG. 3 by considering three networks R1, R2 and R3 connected to the supply device 30 of FIG. 2.

The supply voltage Vr for the consumers is of the order of 30 volts. Let us imagine that one wishes to assign the following priorities "1, 3, 2" respectively to the networks R1, R2 and R3. The voltages V1, V2 and V3 at the output of the adapters A1, A2 and A3 will be set via the settings g1, g2 and g3 respectively to 30 volts, 28 volts and 29 volts. FIG. 3 shows the three diodes D1, D2 and D3 respectively receiving via their anodes the voltages V1=30 volts, V2=28 volts and V3=29 volts of the adapters A1, A2 and A3. The voltages uac1, uac2 and uac3 appearing between the anodes and the cathodes of each of the diodes, lead to only the diode D1, which has an anode cathode voltage uac1 greater than the conduction threshold of the diode, being on, the other two diodes being off. The first network R1 with priority "1" will provide the voltage Vr (Vr=V1 minus the threshold voltage of the diode) and the supply current for the consumers.

If the network R1 fails or is cut, the diode D3 receiving via its anode the next highest voltage (V3=29 volts) turns on, the diodes D1 and D2 being off, the network R3 with priority "2" will provide the supply current to the consumers.

Figure 3:
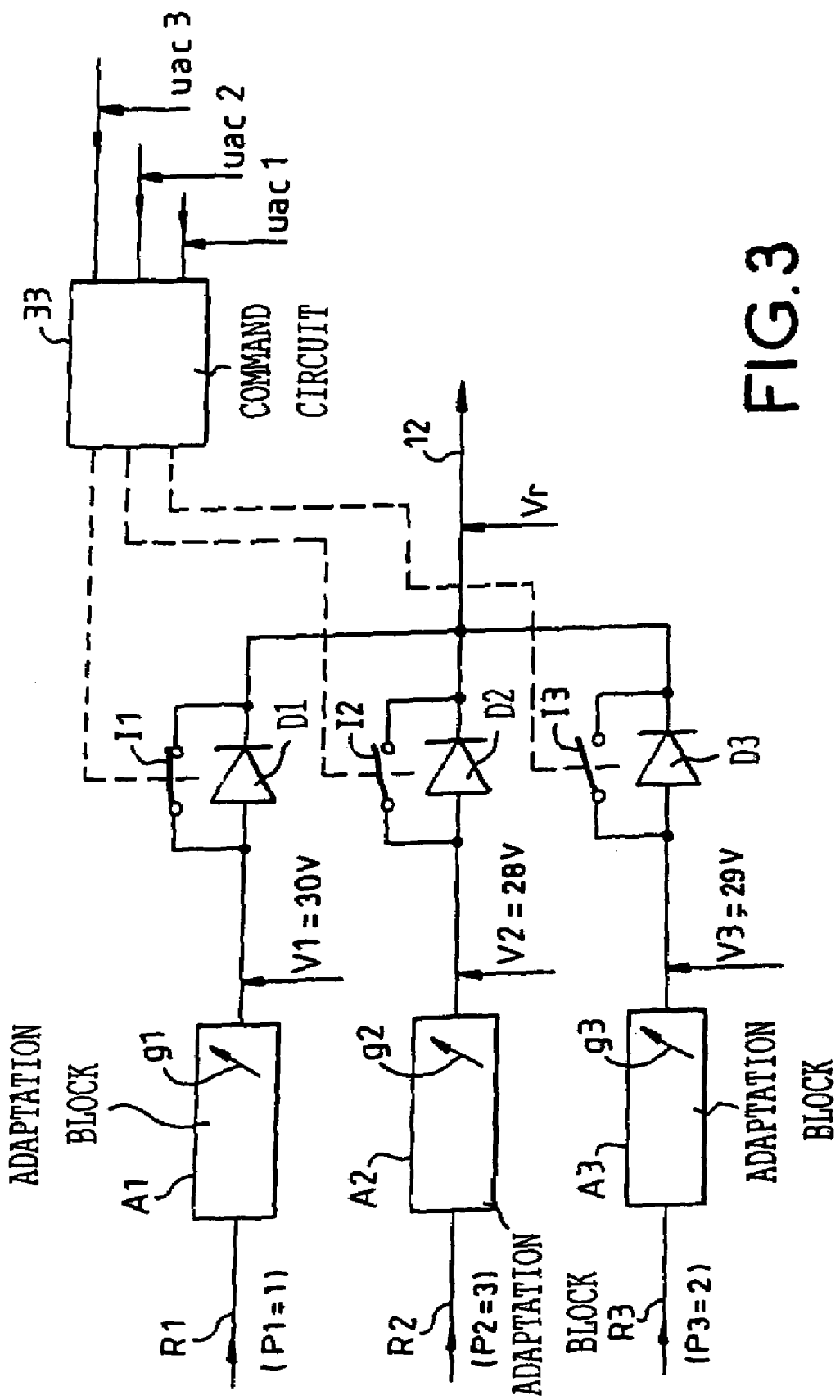
FIG. 3 represents a schematic of a supply device according to the invention, supplied by three networks.

FIG. 3 shows a diode switchpoint, each of the diodes D1, D2 and D3 of the switchpoint comprises a make/break switch I1, I2 and I3 in parallel. The make/break switch, in parallel with the diode of the network supplying the common line 12, is closed, short-circuiting the diode, when the diode is traversed by at least a part of the supply current to the consumers, which part is provided by the chosen network.

The make/break switches I1, I2, I3 can be controlled by a command circuit 33 using for example the measurement of the anode/cathode voltages uac1, uac2 and uac3, of each of the diodes D1, D2 and D3. Upon the powering up of the supply device, the command circuit closes the make/break switch of the diode traversed by the current provided by the priority network. This principle of control of the make/break switches I1, I2, I3 can be used to control the make/break switches Id1, Id2, ... In by the control circuit Cm of the device of FIG. 2, irrespective of the number of networks n comprising n make/break switches I1, I2, ... In.

The make/break switch short-circuiting the diode does away with energy losses in the diode traversed by the supply current for the consumers. Thus, in the example of FIG. 3, the priority network being the network R1, the diode D1 is short-circuited by the make/break switch I1, the voltage on the common supply line Vr then becoming equal to V1.

Figure 1:
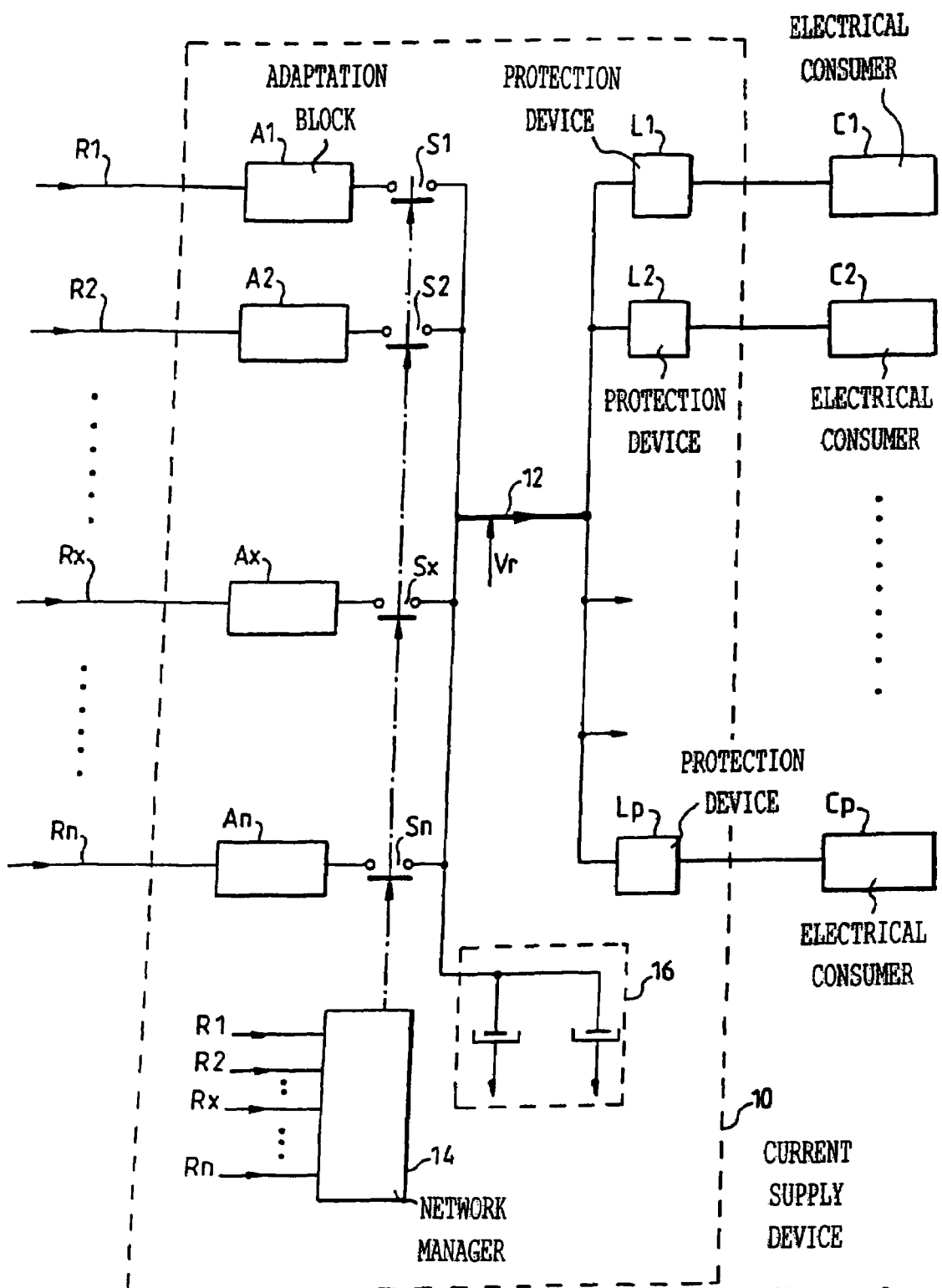

Each of the protection devices L1, L2, ... Lp comprises an input 34 and an output 36, the output 36 being connected to a supply input 38 of the consumers C1, C2, ... Cp. A capacitance Ca1, Ca2, ... Cap is connected between the output 36 of each of the protection devices and a reference potential Vm which may for example be a ground of the supply device 30. The energy reserve connected to the common line 12, of the supply device of the prior art of FIG. 1, is shifted and distributed at the level of the outputs 36 of each of the protection devices. The total capacitance of the energy reserve of FIG. 1 is distributed pro rata with the number of lines Ig1, Ig2, . . . Igp supplying the consumers. For example, the battery 16 of the device of the prior art would exhibit a value of 0.47 farads. For 20 supply lines (p=20) each of the capacitances Ca1, Ca2, . . . Can will have the value 23 500 microfarads i.e. five capacitors of 4 700 microfarads in parallel.

The shifting of the capacitors, distributed at the level of the lines, at the output 36 of the protection devices, comprises the advantage of avoiding propagation of a failure to the entire supply device via a short-circuit of one of the capacitors. Specifically, a capacitor (or block of capacitors) Ca1, Ca2, . . . Cap in short-circuit mode will automatically be isolated from the common supply line 12 through the tripping-out of its corresponding protection device. A single supply line will be lost in this case.

Another advantage of the distributing of the capacitors of the energy reserve lies in the fact that, when the consumers are powered-up, the command and charging of the capacitors Ca1, Ca2, . . . Cap is carried out by the set of tripout limiters L1, L2 . . . Lp. This energy function is distributed over a large number of protection devices.

Advantageously a paralleling diode X1, X2, . . . Xp is connected in parallel between the input 34 and the output 36 of each of the protection devices paralleling through the diodes X1, X2, . . . Xp all the capacitors distributed on the lines, thereby decreasing the influence of the loss of a capacitor on a line. Specifically, in the case of the energy reserve comprising 100 capacitors distributed over 20 lines at the rate of five capacitors per line, a single capacitor is lost out of 100 capacitors whereas, without using paralleling diodes, there would be a loss of 1 capacitor out of 5 capacitors for the line.

Figure 4:
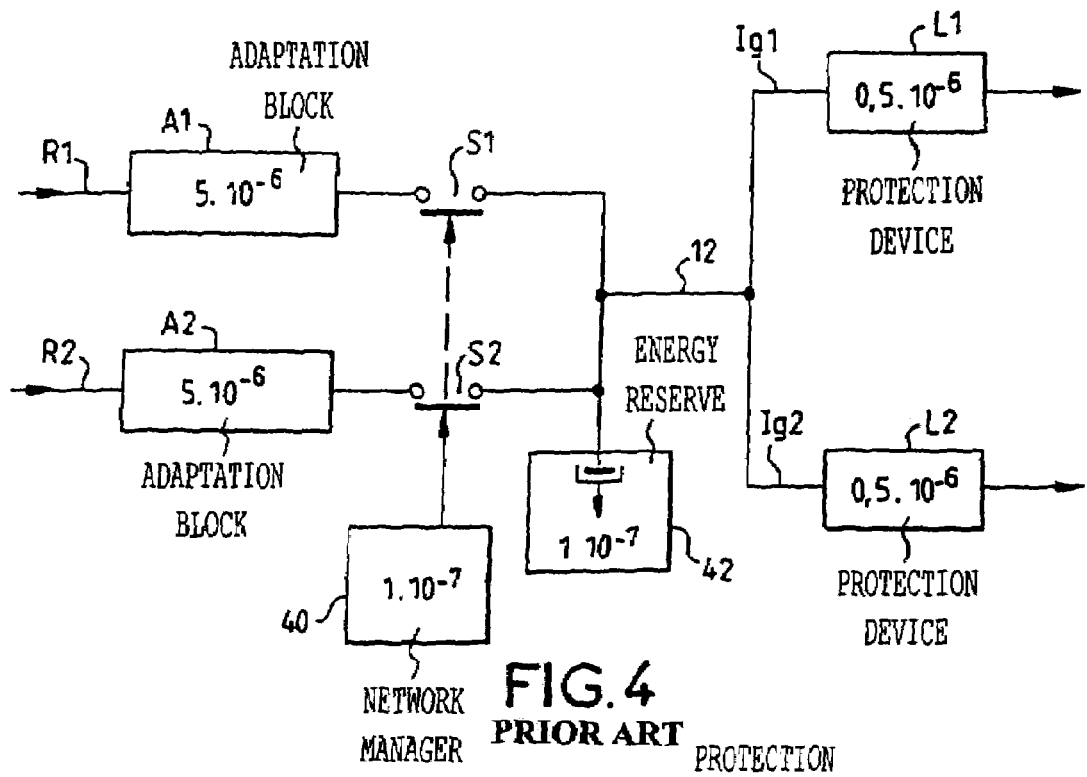
FIGS. 4 and 5 show block diagrams with the probabilities of failure of the subsets of two supply devices.
Figure 5:
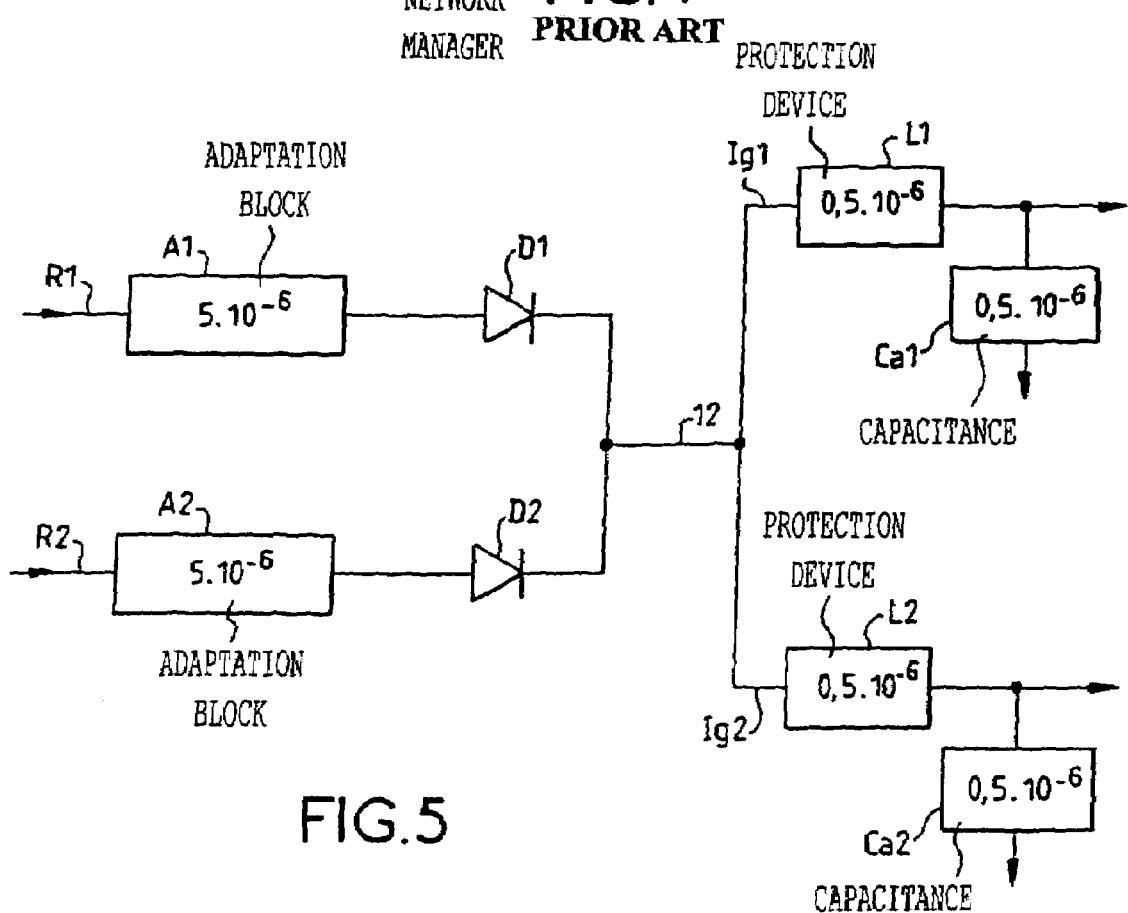

FIGS. 4 and 5 show block diagrams with the probabilities of failure of the subsets of two supply devices making it possible in a simplified manner to quantify the improvement obtained in terms of safety and availability through the supply device according to the invention relative to the devices of the prior art.

FIG. 4 represents the block diagram of a supply device of the prior art comprising two networks R1, R2 and their respective adapters A1, A2, a network manager 40, an energy reserve 42 and two protection devices L1 and L2 for two supply lines Ig1 and Ig2 for the consumers.

FIG. 5 represents the block diagram of a supply device according to the invention comprising the two networks R1, R2, their respective adapters A1, A2 and the two protection devices L1 and L2 of FIG. 4 for the two supply lines for the consumers. The device of FIG. 5 furthermore comprises two capacitances Ca1 and Ca2 on one and the other supply line for the consumers. The numbers inside the blocks represent the probability of failure of each function.

The probabilities of loss of the various functions being the following:

| | |
|---|---|
| Adapters A1, A2 | $5 \cdot 10^{-6}$ per flying hour |
| Manager 40 | $1 \cdot 10^{-7}$ per flying hour |
| (failure of erratic control type on opening of the two contactors S1 and S2) | |
| Energy reserve 16 | $1 \cdot 10^{-7}$ per flying hour |
| Protection device L1, L2 | $0.5 \cdot 10^{-6}$ per flying hour |
| (failure of open circuit or short-circuit type) | |
| Capacitances Ca1, Ca2 | $0.5 \cdot 10^{-6}$ per flying hour |
| (failure of short-circuit type) | |

The feared event is the loss of the entire set of supply lines for the consumers.

In the case of the supply device of the prior art of FIG. 4 the probability of such an event is around
: $1.10^{-7}$ per flying hour or
: $1.10^{-6}$ for 10 flying hours In the case of the supply device according to the invention of FIG. 5, the probability of such an event is:
the loss of the adapters A1 and A2 i.e.:
  $1.10^{-11}$ per flying hour;
  $1.10^{-10}$ per 10 flying hours or:
the failure of short-circuit type of the protection devices L1 and L2 or of the capacitances Ca1 and Ca2 i.e. a probability of:
  $1 \cdot 10^{-12}$ per flying hour
  $1 \cdot 10^{-11}$ per 10 flying hours To summarize, the supply device according to the invention does away with the drawbacks of the supply devices of the prior art, namely:

common failure due to the network manager (14, 40); this manager being dispensed with in the supply device according to the invention while retaining the selection function;

energy losses;

common failure due to the capacitors; the structure according to the invention limits the failure due to the short-circuit of a capacitor to the loss of a single line;

energizing and charging of the capacitors: the structure of the device according to the invention distributes this function over the entire set of tripout limiters.

The invention claimed is:

1. An electrical energy supply device, supplying DC current to electrical consumers from at least one electrical network chosen by a selector circuit of the supply device, from a plurality of electrical networks, the supply device comprising:

an adapter provided for each electrical network, each of the adapters providing, from the electrical network to which the respective adapter is connected, a respective preset DC voltage for supplying the electrical consumers, wherein the selector circuit includes a switchpoint including diodes with cathodes connected together to a common supply point of the electrical consumers, and anodes respectively connected to the electrical networks through respective adapters, and wherein each of the diodes of the switchpoint includes a make/break switch in parallel to short-circuit its respective diode when its respective diode is traversed by at least a part of the current supplying the electrical consumers, which part is provided by a chosen electrical network supplying the electrical consumers, the chosen electrical network being the electrical network connected to the adapter providing a highest preset DC voltage.

2. The electrical energy supply device as claimed in claim 1, wherein the supply device is for carriage on board an aerodyne.

3. The electrical energy supply device as claimed in claim 1, wherein the adapters each comprise a setting configured to adjust their respective output DC voltage levels to predefined levels determining levels of priorities of the electrical networks.

4. The electrical energy supply device as claimed in claim 1, further comprising a peak-limiter device connected respectively to each of the DC current outputs of the adapters, eliminating any failure caused by possible overvoltages at the DC current outputs of said adapters.

5. The supply system as claimed in claim 1, wherein each of the electrical consumers is supplied through a protection device for protecting against overloads by disconnecting the electrical consumer from its supply, an energy reserve capacitor being connected between an output of each of the protection devices and a reference potential of the supply device, and wherein a diode for paralleling the energy reserve capacitors is connected between an input and the output of each of the protection devices, an anode of the paralleling diode being connected on a consumer supply side.

6. The supply system as claimed in claim 5, wherein the reference potential is a ground of the supply device.

7. The supply system as claimed in claim 1, wherein the make/break switches are controlled by a command circuit using measurement of the anode/cathode voltages of each of the diodes of the diode switchpoint, the command circuit, upon powering-up of the supply device, closing the make/break switch of the diode traversed by current provided by a priority network.

* * * * *